United States Patent [19]

Katsumura

[11] Patent Number: 4,788,497
[45] Date of Patent: Nov. 29, 1988

[54] APPARATUS FOR MEASURING MOTOR ROTATION POSITION AND SPEED
[75] Inventor: Nobuo Katsumura, Hachioji, Japan
[73] Assignee: Konica, Tokyo, Japan
[21] Appl. No.: 13,139
[22] Filed: Feb. 10, 1987
[30] Foreign Application Priority Data
 Feb. 12, 1986 [JP] Japan ................... 61-28561
[51] Int. Cl.$^4$ ............................. G01P 3/46
[52] U.S. Cl. ......................... 324/177; 73/518; 324/158 MG; 324/160
[58] Field of Search ............ 324/177, 160, 158 MG, 324/545, 134; 73/518, 517 A, 505; 310/168, 233

[56] References Cited
U.S. PATENT DOCUMENTS
3,675,126 7/1972 Chilton .................... 324/177 X
4,684,858 8/1987 Ma et al. ................. 324/177 X FOREIGN PATENT DOCUMENTS
113956 9/1980 Japan ..................... 324/177

Primary Examiner—Reinhard J. Eisenzopf
Assistant Examiner—Robert W. Mueller
Attorney, Agent, or Firm—Finnegan, Henderson, Farabow, Garrett & Dunner

[57] ABSTRACT

An apparatus for detecting the speed and position of a rotating shaft of an electrical motor. A commutator is provided having three or more poles. First and second brushes are provided in sliding contact with the commutator for supplying electrical power to the poles of the commutator. At least one of the poles is in electrical communication with the shaft. Rotation detection means measure the electrical potential difference between the shaft and ground and generate a rotation information signal in response to the changes in the electrical potential difference as the shaft rotates.

6 Claims, 6 Drawing Sheets

ROTATION INFORMATION SIGNAL

FILTERED SIGNAL

ROTATION INFORMATION OUTPUT

APPARATUS FOR MEASURING MOTOR ROTATION POSITION AND SPEED

BACKGROUND OF THE INVENTION

1. Field of the Invention

The present invention relates to a motor of a structure having a commutator and a brush for feeding power and, more particularly, to a motor having a mechanism which outputs rotation information representing a rotation position and speed.

2. Description of the Prior Art

No conventional motor having a commutator and a brush for feeding power has a mechanism which outputs rotation information corresponding to a rotation position and speed therein. That is, no conventional motor outputs rotation information as a motor itself. For this reason, since rotation information cannot be obtained by the motor itself, a rotation detection device such as a rotary encoder must be provided outside the motor to drive the motor at a constant speed or to rotate it by a predetermined angular interval. However, with this arrangement, a system combining the motor and the rotation detection device is enlarged as a whole when compared to the motor itself, resulting in high cost.

SUMMARY OF THE INVENTION

The present invention has been made in consideration of the above problem and has as its object to provide, by slightly modifying a conventional motor arrangement, a motor which can output rotation information. In other words, it is an object of the present invention to provide, without enlarging a size of the motor or increasing cost much, a motor which does not require a rotation detection device such as a rotary encoder even when the motor is to be driven at a constant speed or to be rotated by a predetermined angular interval. According to the present invention, in a motor of a structure having a commutator and a brush for feeding power, at least one pole of the commutator conducts with the rotating shaft of the motor to detect rotation information.

BRIEF DESCRIPTION OF THE DRAWINGS

FIGS. 2A and 2B are sectional views showing electrical connection states between an armature winding and a commutator of the motor according to the present invention, in which FIG. 2A shows a delta connection and FIG. 2B shows a star connection;

FIGS. 4A and 4B are equivalent circuit diagrams of the armature winding of the motor according to the present invention, in which FIG. 4A shows a delta connection and FIG. 4B shows a star connection;

DETAILED DESCRIPTION OF THE PREFERRED EMBODIMENTS

Embodiments of the present invention will now be described in detail with reference to the accompanying drawings.

Figure 1:
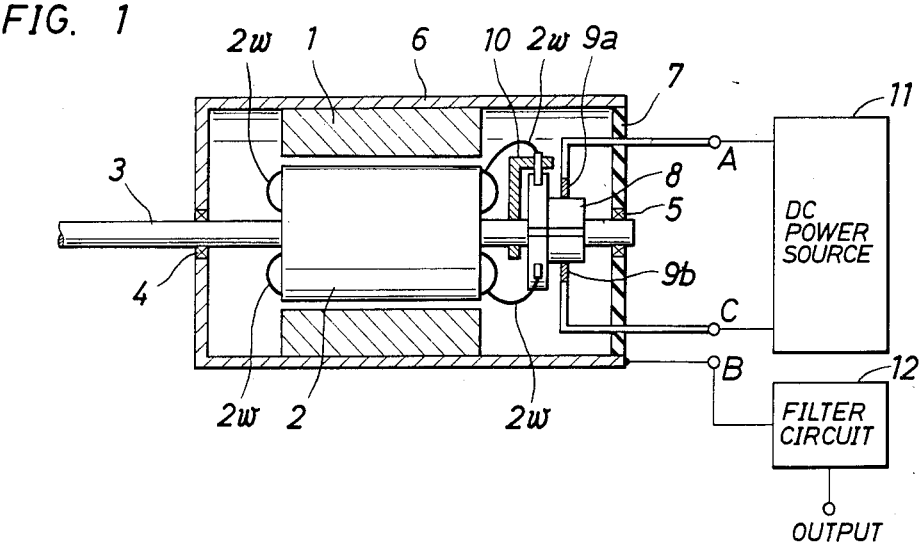
FIG. 1 is a schematic view of an arrangement of a DC motor according to an embodiment of a motor of the present invention.
Figure 2A:
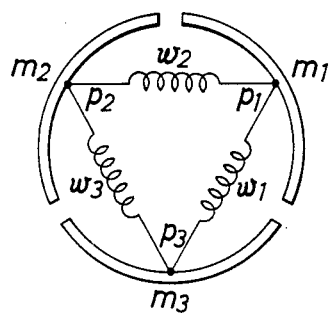
Figure 2B:
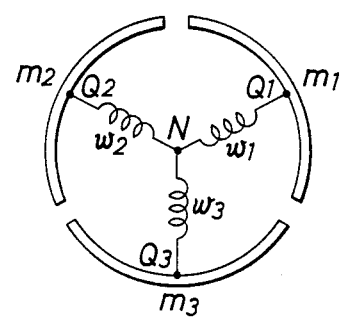

FIG. 1 shows an arrangement of an embodiment of the present invention. This embodiment relates to a DC motor using an armature winding having a rotor of 3-slot (3-pole) type and two permanent magnets for a stator. In FIG. 1, reference numeral 1 denotes a magnet which is magnetized in a predetermined direction; 2, an armature which is positioned inside the magnet and around which an armature winding 2W is wound; 3, a rotating shaft of a conductive material coupled integrally with the armature; and 4 and 5, bearings for supporting the rotating shaft. In this DC motor, the magnet 1 serves as a stator and the armature 2 rotates integrally with the rotating shaft 3. Of the bearings 4 and 5 which support the rotating shaft 3, the bearing 4 is made of a conductive material and mounted to a box 6 which is also made of a conductive material. The bearing 5 is mounted to an insulating member 7 which covers an opening of the box 6. Reference numeral 8 denotes a commutator with three poles which is connected to external terminals A and C through brushes 9a and 9b, and the external terminals A and C are connected to a DC power supply 11. Assume that a voltage value of the DC power supply 11 is $V_B$. The armature winding 2W of the armature 2 is connected to the three poles of the commutator 8 in the following manner. When the armature winding 2W is connected by a delta connection, as shown in FIG. 2A, connection points P1, P2, and P3 of windings W1, W2, and W3 are respectively connected to three poles $m_1$, $m_2$, and $m_3$ of the commutator 8. In the case of a star connection, as shown in FIG. 2B, ends of the windings W1, W2, and W3 are connected to each other at a point N and the other ends Q1, Q2, and Q3 are respectively connected to the poles $m_1$, $m_2$, and $m_3$ of the commutator 8. The armature winding 2W receives power from the above-mentioned external terminals A and C through the brushes 9a and 9b and the commutator 8. Reference numeral 10 denotes a conductive member which electrically connects one of the three poles of the commutator 8 and the rotating shaft 3. The box 6 is electrically connected to one of the poles of the commutator 8 through the conductive member 10, the rotating shaft 3, and the bearing 4. A terminal B for the box 6 is connected to a filter circuit 12, and an outut from the filter circuit 12 serves as a rotation information signal.

Figure 3:
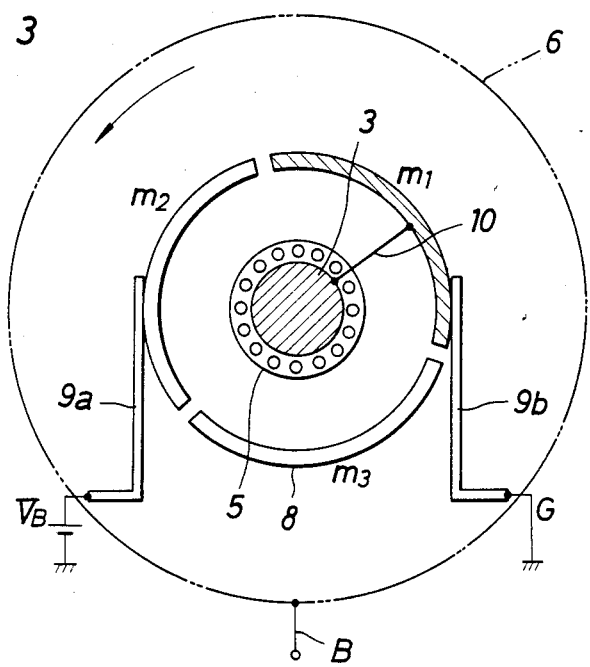
FIG. 3 is a schematic view of a rotation information detection mechanism of the motor according to the present invention.

FIG. 3 shows a condition in which the commutator 8 contacts the brushes 9a and 9b. The commutator 8 is constituted by three poles $m_1$, $m_2$, and $m_3$, and the pole $m_1$ indicated by hatched lines is connected to the rotating shaft 3 by the conductive member 10. The brush 9a is connected to a $V_B$ terminal of the DC power supply 11, and the brush 9b is connected to a G terminal at the ground side.

Figure 4A:
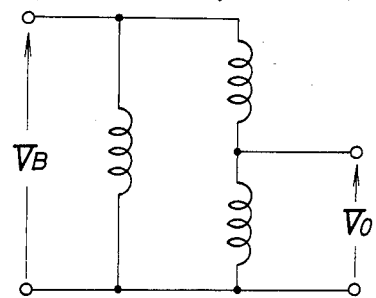
Figure 4B:
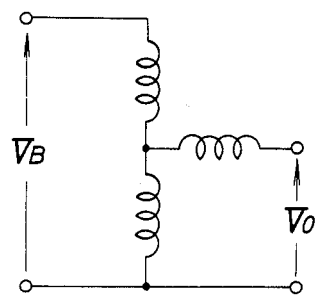

An operation of the above embodiment will be described below with reference to FIG. 4. Assuming that the commutator 8 rotates together with the rotating shaft 3 counterclockwise in FIG. 3, since the pole $m_1$ of the commutator 8 contacts the brush 9b in a $\frac{1}{3}$ period as shown in FIG. 3, the pole $m_1$ is at a ground potential G. In the next 1/6 period, the pole $m_1$ is in a noncontacting state, i.e., the pole $m_1$ of the commutator 8 does not contact either of the brushes 9a and 9b. In the next $\frac{1}{3}$ period, the pole $m_1$ contacts the brush 9b and hence is at a positive potential $V_B$. In the next 1/6 period, the pole $m_1$ is again in the noncontacting state.

A potential of the pole $m_1$ in the noncontacting state is as follows in terms of the connection methods between the commutator 8 and the armature winding 2W.

Figure 5:
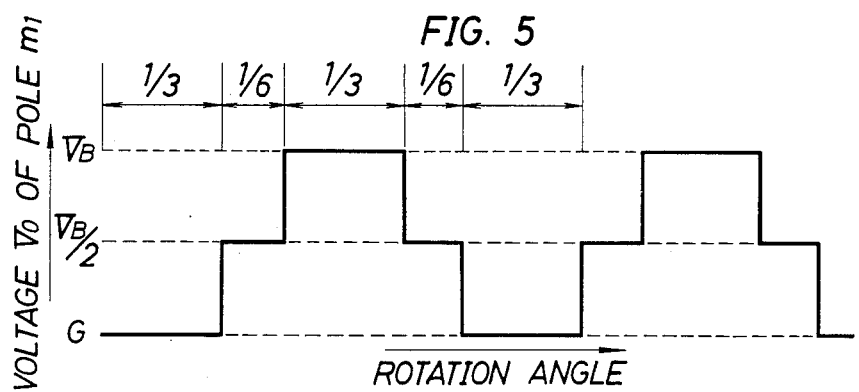
FIG. 5 is a graph of an output waveform of the DC motor as shown in FIG. 1.

Since there are two connection methods, i.e., the delta connection and the star connection, as shown in FIGS. 2A and 2B, respectively, the noncontacting state of the pole $m_1$ must be considered with respect to the above two kinds of connections. In these cases, poles $m_2$ and $m_3$ contact the brushes 9a and 9b, respectively. Assuming that a potential of the pole $m_1$ is $V_0$, equivalent circuit diagrams in these noncontacting states in the delta and star connections are respectively shown in FIGS. 4A and 4B. As is apparent from these equivalent circuit diagrams, when a voltage induced at the armature winding 2W along with rotation of the armature is neglected in the noncontacting state, the voltage $V_0$ appearing at the pole $m_1$ is $V_B/2$ regardless of the connection method. Accordingly, a potential appearing at the box 6 from the pole $m_1$ through the conductive member 10 and the rotating shaft 3 is as shown in FIG. 5.

Since a pulse signal appearing at the box 6 is extracted through the lead wire B, by measuring the number or the interval of the pulse signals or by smoothing the signal to measure its voltage level, rotation information such as position information or speed information can be obtained. The number or interval of the pulses can be easily measured by any conventional means.

Figure 7A:
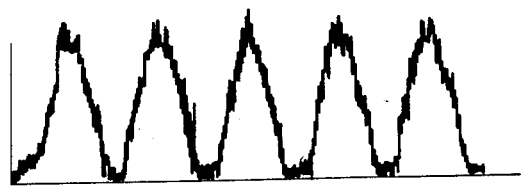
FIGS. 7(a) to 7(c) are graphs of output waveforms for explaining a function of the filter circuit.

In general, the rotation information signal (shown in FIG. 7(a)) of the motor extracted from the terminal B of the motor normally includes glitch noise. Therefore, when rotation information extracted from the terminal B is directly input to a counter, the counter is erroneously operated. For this reason, a rotation information signal extracted from the terminal B is supplied to the filter circuit 12 to remove the glitch noise. As a result, the rotation information signal extracted from the filter circuit 12 becomes a noiseless pulse, thereby reliably counting speed of rotation.

Figure 6A:
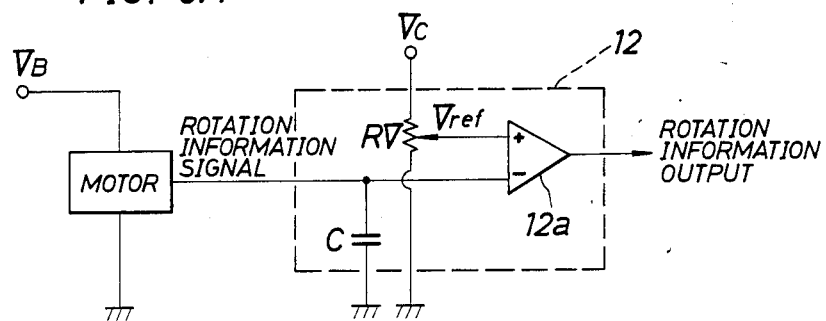
FIGS. 6A to 6C are circuit diagrams showing examples of a filter circuit used in the motor according to the present invention.
Figure 6B:
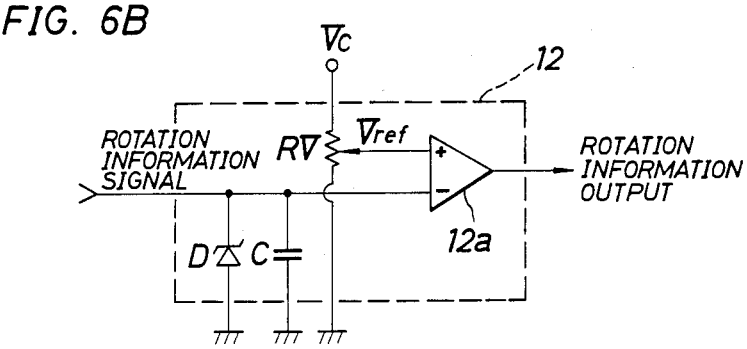
Figure 6C:
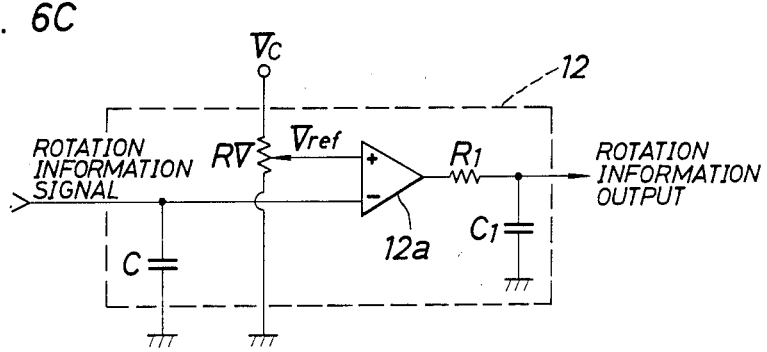

FIGS. 6A to 6C show examples of various arrangements of the filter circuit 12. A circuit shown in FIG. 6A supplies a rotation information signal from the motor, the glitch of which is removed by a capacitor C, to one input terminal of a comparator 12a and compares it with a reference voltage $V_{ref}$ at the other input terminal. From the comparator 12a, a noiseless pulse from which the noise is removed can be obtained as a rotation information output. In the circuit shown in FIG. 6A, the reference voltage $V_{ref}$ is a value obtained by voltage-dividing a voltage $V_C$ by a variable resistor RV and hence can be arbitrarily set. In the case of the embodiment shown in FIG. 6A, the noise can be removed by an extremely simple arrangement in which only one capacitor is connected to the rotation information output terminal of the motor.

In the filter circuit 12 shown in FIG. 6B, a peak position of the waveform which is superposed on the rotation information signal by a reverse electromotive force of the motor, is clipped by a zerner diode D up to a zener voltage. A circuit thereafter is the same as shown in FIG. 6A, so that a description thereof will be omitted. Thus, the peak voltage can be removed by inserting the zener diode D into the signal line, thereby preventing the comparator 12a from being destructed.

In a filter circuit shown in FIG. 6C, an RC filter for removing a high frequency consisting of a resistor $R_1$ and a capacitor $C_1$ is inserted at the output stage of the comparator 12a, thereby further improving the effect of removing the glitch noise.

Figure 7B:
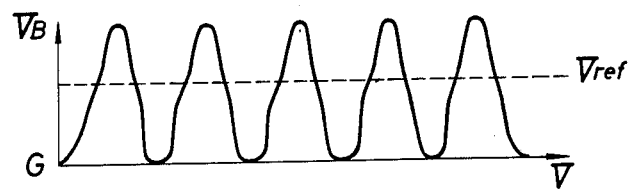
Figure 7C:
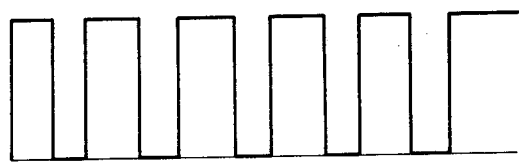

FIGS. 7(a) to 7(c) show an effect of the filter circuit 12, in which FIG. 7(a) shows a rotation information signal extracted from the motor, FIG. 7(b) shows an effect of the capacitor C, and FIG. 7(c) shows an outut of the comparator 12a. The superposed glitch noise shown in FIG. 7(a) is removed by the capacitor C as shown in FIG. 7(b) and is output as a noiseless pulse waveform as shown in FIG. 7(c).

With the filter circuits as shown in FIGS. 6(a) to 6(c), since the outut from the comparator 12a can be matched with a logic level of, e.g., 0 to 5 V, the output can be directly connected to a digital circuit, thereby performing level matching. A rotation information signal extracted from the motor has an analog waveform with many noise components and hence has a poor matching property for processing in a logic circuit at the output stage. However, using the comparator 12a capable of arbitrarily adjusting an output level, the output level can be conveniently matched with the logic level (e.g., 0 to 5 V) of the logic circuit at the output stage.

With the above arrangement, since the motor itself outputs rotation information, by utilizing the rotation information, a rotation detection device such as a rotary encoder need not be externally mounted to the motor even when a position or speed is to be controlled. In addition, an arrangement required to output the rotation information is very simple. Therefore, the motor is not much enlarged and cost is not much increased by adding this function as compared with a conventional motor.

Therefore, only a motor of the present invention is necessary for an application which conventionally requires a combination of a motor and a rotation detection device, thereby greatly saving a space. For example, the motor of the present invention can be easily incorporated in a device, which requires a driving force of a motor together with rotation information such as position information or speed information, such as a lens drive, film advance, or collapsible barrel device of a camera, and the motor can be easily disposed around the lens. In addition, cost can be greatly reduced compared to that of a combination of a conventional motor and a rotation detection device.

In addition, the motor obtains rotation power by a current flowing through the brush and the commutator, and rotation information is detected from the same source. Therefore, if only the motor rotates, the signal can be obtained. For this reason, with the above arrangement, detection can be performed throughout the rotation area of the motor.

Furthermore, for the same reason, reliability of the detection function is high, and its service life is not a problem at all. That is, it is generally accepted that the service life of the motor is determined by the commutator and the brush, and the service life of the motor directly determines that of the detection function.

Generally, in many cases, a motor is decelerated by a gear, and the rotation information obtained by the above arrangement is obtained before deceleration. Therefore, when the motor is decelerated at a ratio 1/30 to drive a load, measurement can be performed by a fine scale of 1/30 upon one rotation of the final pole, so that a position and speed are accurately controlled.

PLL (Phase Locked Loop) is one of methods of controlling a motor at constant speed, and a speed signal suitable for the PLL can be obtained by the above arrangement. Therefore, if the motor according to the present invention is to be driven at a constatnt speed by the PLL, the arrangement becomes very simple.

In addition, in the case of the motor with the above arrangement, whether the motor is stopped can be detected by detecting whether an output level at the lead wire B remains the same for a predetermined time or more.

Note that the present invention is not limited to the above embodiment, but various modifications may be made as follows.

Figure 8:
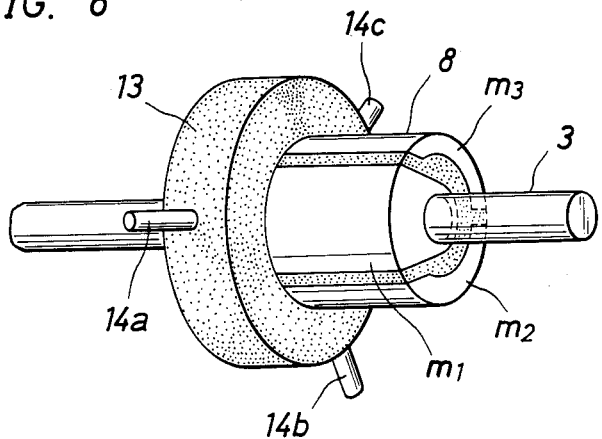
FIG. 8 is a perspective view of an important part of another embodiment of the motor according to the present invention.
Figure 9A:
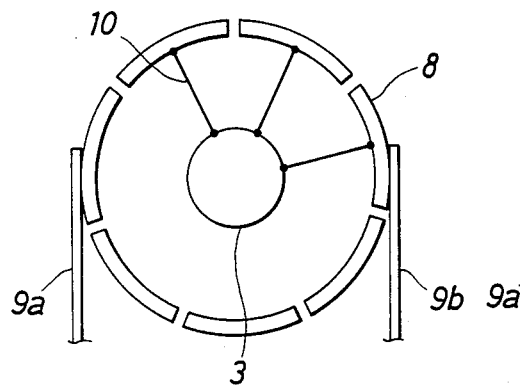
FIGS. 9A to 9D are schematic views of the conducting states of still another embodiment of the motor according to the present invention.
Figure 9B:
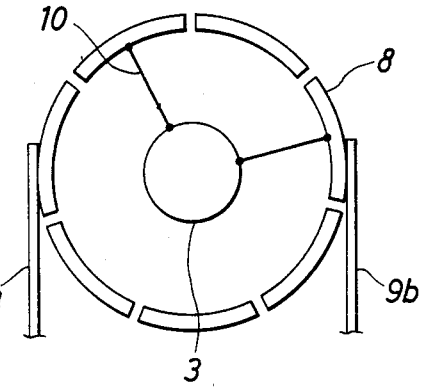
Figure 9C:
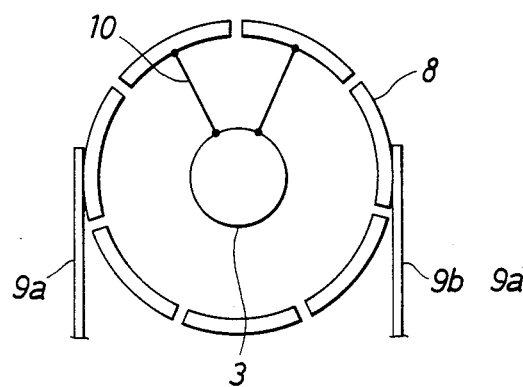
Figure 9D:
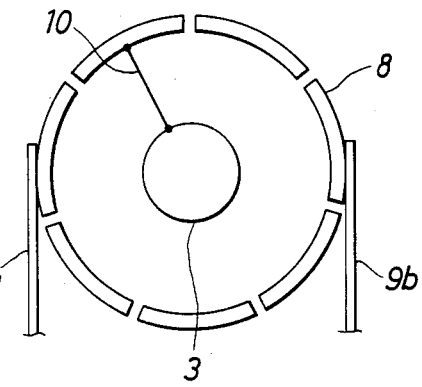

A conductive member is provided independently from other components in the above embodiment. However, as shown in FIG. 8, the pole $m_1$ among three poles $m_1$, $m_2$, and $m_3$ of the commutator 8 may be extended to conduct with the rotating shaft 3 so as to serve as a conductive member 10. In FIG. 8, the poles $m_1$, $m_2$, and $m_3$ are electrically connected to conductive projections 14a, 14b, and 14c inside an insulating support 13. The projections 14a, 14b, and 14c are electrically connected to the armature winding.

The commutator 8 need not have three poles (a rotor has three slots), and a pole which conducts the commutator 8 with the rotating shaft 3 need not be one. For example, in the case of a motor with five or seven poles, two or three poles can be conducted at the same time. In the case of seven poles, four variations may be made as shown in FIGS. 9A to 9D (these variations are selected so that two poles contacting the brushes 9a and 9b do not conduct at the same time).

The signal of rotation information is obtained from the box 6 through the bearing 4. However, a pin may be projected from the insulating member 7 to conduct the bearing 5 so that the signal is obtained therefrom. At this time, if an insulating member is inserted between the bearing 4 and the box 6, the box 6 can be electrically floated. Note that the rotating shaft 3 must be insulated from a gear or the like mounted thereto, a mounting portion may be covered with an insulating material such as a plastic or the gear itself may be made of plastic or the like.

Figure 10A:
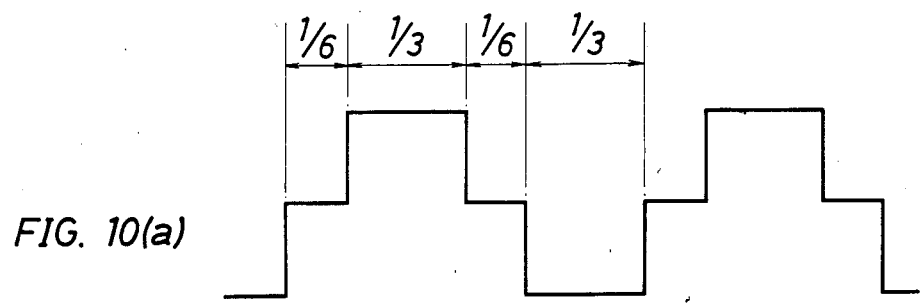
FIGS. 10(a) to 10(c) are graphs of output waveforms when the present invention is applied to a universal motor.
Figure 10B:
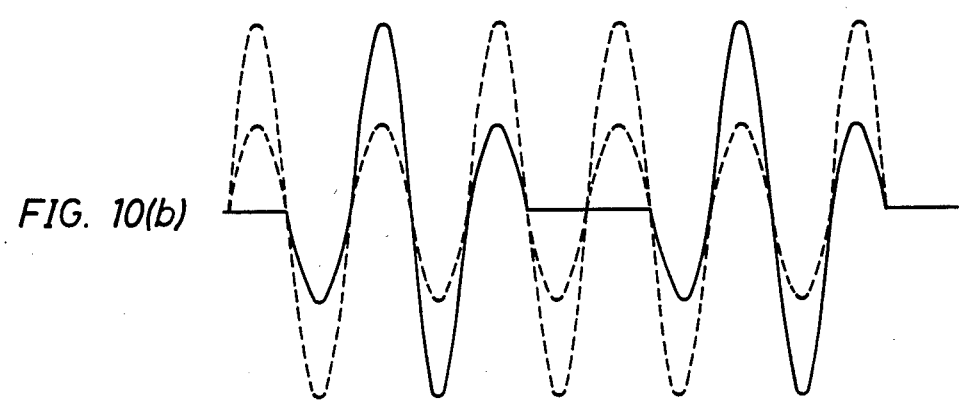
Figure 10C:
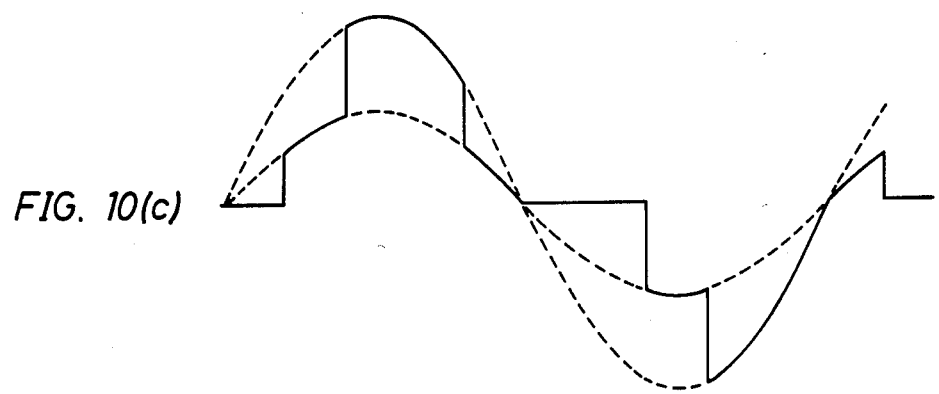

A motor which can be added with a rotation information detection function by the present invention need only have a commutator and a brush, and not only a DC motor but also an universal motor may be used. For example, when the present invention is applied to a universal motor and driven by an AC current, output waveforms as shown in FIGS. 10(b) and 10(c) are obtained from the signal output terminal by the AC current in correspondence with the waveform obtained by the DC motor as shown in FIG. 10(a). Note that in FIGS. 10(b) and 10(c), waveforms indicated by dotted lines represent supply power supply voltages. In the case of the AC current, a waveform similar to, although not a rectangular waveform, that is obtained by the DC current can be obtained. The present invention can be applied to not only a low power motor but also a high power motor in terms of its capacity.

What is claimed is:

1. An apparatus for detecting the speed and position of a rotating shaft of an electrical motor comprising:
   a commutator associated with said shaft having three or more poles;
   first and second brushes in sliding contact with said commutator for supplying electrical power to said poles of said commutator;
   at least one of said poles being in electrical communication with said shaft; and
   rotation detection means for measuring the electrical potential difference between said shaft and ground and generating a rotation information signal in response thereto.

2. An apparatus as claimed in claim 1 wherein said rotation information signal contains information of the relative positions of said shaft and said first and second brushes and information of the rotational velocity of said shaft when said shaft is rotating.

3. An apparatus as claimed in claim 1 wherein said rotation detection means further includes a filter circuit for removing noise from said rotation information signal.

4. An apparatus as claimed in claim 1 further including:
   first and second bearings to support a first end and a second end, respectively, of said shaft; and
   said rotation detection means being adapted to measure the potential difference between said shaft and ground through said first bearing.

5. An apparatus as claimed in claim 1 wherein said motor is a DC motor.

6. An apparatus as claimed in claim 1 wherein said motor is a universal motor.

* * * * *